G. W. Dudderar.
Tree Protector.
No. 61,177.            Patented Jan. 15, 1867.
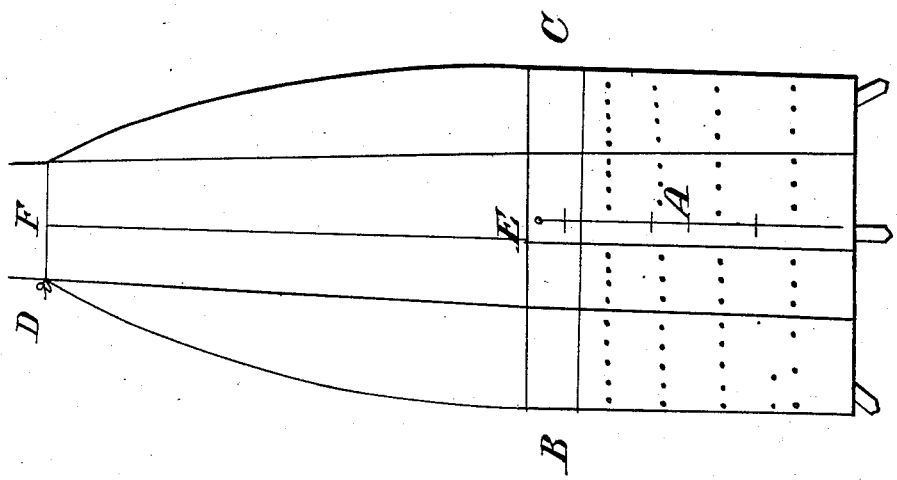
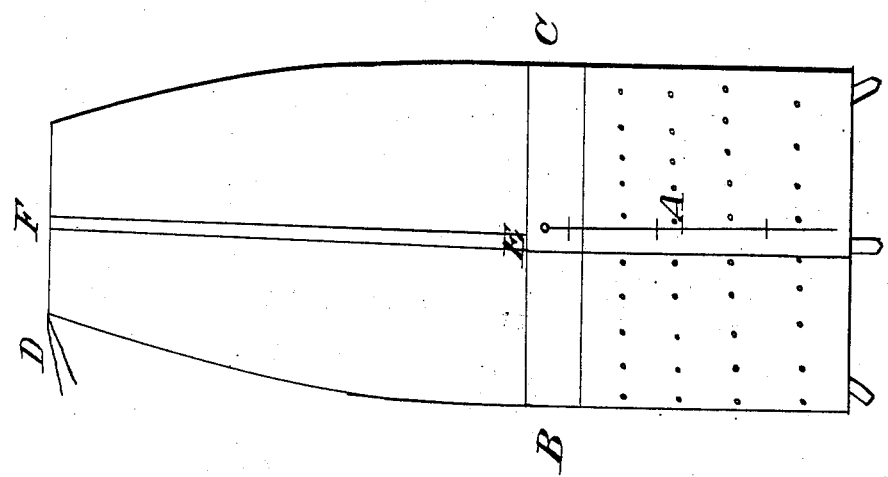
Witnesses.
Ezra Slifer
Geo. W. Miller
Inventor
Geo. W. Dudderar

United States Patent Office.

GEORGE W. DUDDERAR, OF UNIONVILLE, MARYLAND.

Letters Patent No. 61,177, dated January 15, 1867.

---

IMPROVEMENT IN DEVICE FOR PROTECTING TREES FROM THE BORER.

---

The Schedule referred to in these Letters Patent and making part of the same.

---

TO ALL WHOM IT MAY CONCERN:

Be it known that I, GEORGE W. DUDDERAR, of Unionville, in the county of Frederick, in the State of Maryland, have invented a new and improved mode of preventing the "Borer" from destroying Fruit Trees. This appliance is more particularly designed to protect peach trees from the ravages of this insect; and I do hereby declare that the following is a full and exact description thereof, reference being had to the accompanying drawings, and to the letters of reference marked thereon.

The nature of my invention consists in providing an adjustable cylinder, &c., by which to prevent the "borer" from gaining access to the roots and lower part of the trunk of the tree.

To enable others skilled in the art to make and use my invention, I will proceed to describe its construction and operation.

I construct my cylinder of sheet iron tinned, or of any other metal or substance adapted thereto of suitable dimensions, perforated so as to admit sufficient air for ventilation. I attach three feet to one end of the cylinder upon which it stands in an upright position, which prevents it from rising or sinking when placed in the earth. I fasten the cylinder together by a long key, A, which passes through three ears, as will appear by reference to the accompanying drawings. I attach to the other end of the cylinder, by means of a metallic band or rim, B C, secured by rivets, a piece of oil-cloth or any other suitable material of the requisite length, with a braid or elastic draw-string, D, at the opposite end thereof. The cylinder is constructed so as to open readily by drawing the key A, and it is then adjusted around the trunk of the tree in an upright position, as shown by Figure 2 in the drawings, and sunk below the surface of the earth the necessary depth, say from two to three inches; the key A is then inserted in its place, and the lap of the oil-cloth E F, attached to the upper end of the cylinder, is carefully sewed together, and the draw-string D, fig. 2, drawn closely around the trunk of the tree and securely fastened, and the earth pressed around the base of the cylinder so as to keep it in position. The cylinder is painted to protect it from rust or decay, and the oil-cloth, or other material used instead thereof, is painted or saturated with oil to preserve it from the weather.

What I claim as my invention, and desire to secure by Letters Patent, is—

The application of an adjustable appliance to the trunk of fruit trees to protect them, as herein described, using for that purpose the aforesaid cylinder and oil-cloth top or addition, or any other substantially the same and which will produce the intended effect.

GEO. W. DUDDERAR.

Witnesses:
   THOS. M. HOLBUNER,
   J. IJAMS DUVALL.